United States Patent [19]

Weirich

[11] 4,310,027

[45] Jan. 12, 1982

[54] HYDRAULIC CONTROL DEVICES FOR USE WITH MINING APPARATUS

[75] Inventor: Walter Weirich, Dortmund, Fed. Rep. of Germany

[73] Assignee: Gewerkschaft Eisenhutte Westfalia, Fed. Rep. of Germany

[21] Appl. No.: 98,182

[22] Filed: Nov. 28, 1979

[30] Foreign Application Priority Data

Dec. 1, 1978 [DE] Fed. Rep. of Germany ....... 2851937

[51] Int. Cl.³ .......................................... F16K 31/524
[52] U.S. Cl. .................... 137/637.2; 251/263; 74/54
[58] Field of Search ............... 137/637, 637.1, 637.2; 251/263; 74/54

[56] References Cited

U.S. PATENT DOCUMENTS

| | | | |
|---|---|---|---|
| 2,040,990 | 5/1936 | Haar et al. | 137/637.2 |
| 2,276,433 | 3/1942 | Sturman | 137/637 |
| 2,574,624 | 11/1951 | Cochin | 137/637 |
| 2,592,906 | 4/1952 | Jirsa et al. | 137/637.1 |
| 2,766,772 | 10/1956 | Welty et al. | 251/263 |
| 2,897,891 | 8/1959 | Nergaard | 137/637 |
| 2,898,938 | 8/1959 | Dombre | 137/637.2 |
| 3,390,921 | 7/1968 | Klimek | 251/263 |
| 3,469,461 | 9/1969 | Ludwig | 251/263 |
| 3,973,594 | 8/1976 | Gustafsson et al. | 137/637 |

FOREIGN PATENT DOCUMENTS 1550439 12/1970 Fed. Rep. of Germany .
2605758 7/1977 Fed. Rep. of Germany .
2049869 1/1978 Fed. Rep. of Germany .

Primary Examiner—Martin P. Schwadron
Assistant Examiner—G. L. Walton
Attorney, Agent, or Firm—Thompson, Birch, Gauthier & Samuels

[57] ABSTRACT

A unitary hydraulic control device, especially for use with mining apparatus, has a main housing carrying replaceable individual valves arranged in bores. The valves are operated by tappets which engage on cams provided on one of three relatively rotatable coaxial parts forming a multi-part cam shaft. The rotatable parts have hand levers external to the housing permitting the parts to be partly-rotated in either direction, together or separately, to operate selected groups of valves. Each rotatable part has its own "dead man's" handle safety or restoring system which automatically return the rotatable part to a neutral position upon release of its hand lever and after part-rotation in either direction. Each such system is composed of a pair of spring-loaded plungers guided in casings fitted in the housing and engaging on diametrically-opposed cam surfaces of an additional cam on the associated rotatable cam shaft part.

13 Claims, 3 Drawing Figures

HYDRAULIC CONTROL DEVICES FOR USE WITH MINING APPARATUS

BACKGROUND TO THE INVENTION

The present invention relates to hydraulic control devices particularly, but not solely, for use with mining apparatus, such as displaceable roof supports.

In the mining field, it is known to provide a number of individual control valves in a common block or housing and to actuate the valves when desired by means of a manually-operated lever outside the housing. Usually, the housing is located in an accessible position on or in the vicinity of the apparatus being controlled. The lever is moved by an operator to rotate a cam shaft in the housing which acts with its cam to displace tappets of selected valves to thereby connect hydraulic working chambers of the apparatus to hydraulic pressure fluid feed and return lines in a desired manner. Examples of known devices of this type are described in German Pat. Nos. 2605758 and 1550439. It is also known to utilize devices employing rotary slide valves operated by hand levers to control mining apparatus, such as that described in German Pat. No. 2049869.

A general object of the present invention is to provide an improved hydraulic control device.

SUMMARY OF THE INVENTION

According to the present invention, there is provided a hydraulic control device comprising a housing provided with a plurality of individual valves and rotatable cam shaft means actuated by at least one hand lever external of the housing for operating the valves and means acting on the cam shaft to bais the latter to a pre-determined position automatically when the hand lever is released.

Where the apparatus to be controlled by the device has hydraulic chambers which are to be supplied with pressure fluid or evacuated individually or in groups, as is common with mine-roof supports, it is desirable to construct the cam shaft means from a plurality of relatively-rotatable coaxial parts, each part having its own hand lever and serving to operate some of the valves. Each rotatable part may then have its own biasing means. In a preferred embodiment of the invention, the cam shaft means is composed of a plurality of relatively-rotatable parts, each actuated by its own hand lever to actuate some of the valves and each rotatable cam shaft part has at least one additional cam mounted thereon which is subjected to the action of biasing means which automatically restores the associated cam shaft part back to a pre-determined neutral position when its hand lever is released. The hand levers of the rotatable parts can be disposed close together for manual actuation collectively or individually.

The aforesaid biasing or restoring means effectively forms a "dead man's" handle safety system ensuring the device overall adopts its neutral condition whenever the hand lever or levers are released after any operative movement.

The biasing means may include one or more springs tensioned or compressed as the cam shaft means is partly rotated. Alternatively, the biasing means may take the form of one or more hydraulic piston and cylinder units. Preference is given to spring-loaded plungers acting on cam surfaces, conveniently diametrically-opposed surfaces, of an additional cam on the cam shaft means. The biasing means can be located in a safe protected position within the housing or block. Where spring-loaded plungers are adopted, these can be located and guided in small casings fitted to the housing or bores in the housing.

The cams for actuating the valves and the biasing or restoring means can be small, plate-like components, some of which also serve as axial spacers for the others.

Conveniently, the individual valves can be arranged in groups side-by-side accessible for replacement from different exterior faces of the housing. The groups of valves can be, for example, arranged in planes offset by 90° from one another. The operation of the valves can be accomplished by part rotation of the cam shaft means or one or more of its constituent rotatable parts through a relatively small angle, e.g., less than 90° and, more preferably, less than 45°. This involves comparatively small displacement of the handle or handles thereby ensuring the device does not require undue working space. Furthermore, the or each restoring or biasing means is then required only to move the cam shaft means or one of its parts through a relatively small rotational angle.

The invention may be understood more readily, and various other features of the invention may become apparent, from consideration of the following description.

BRIEF DESCRIPTION OF DRAWINGS

An embodiment of the invention will now be described, by way of example only, with reference to the accompanying drawing, wherein.

DESCRIPTION OF PREFERRED EMBODIMENT

Figure 1:
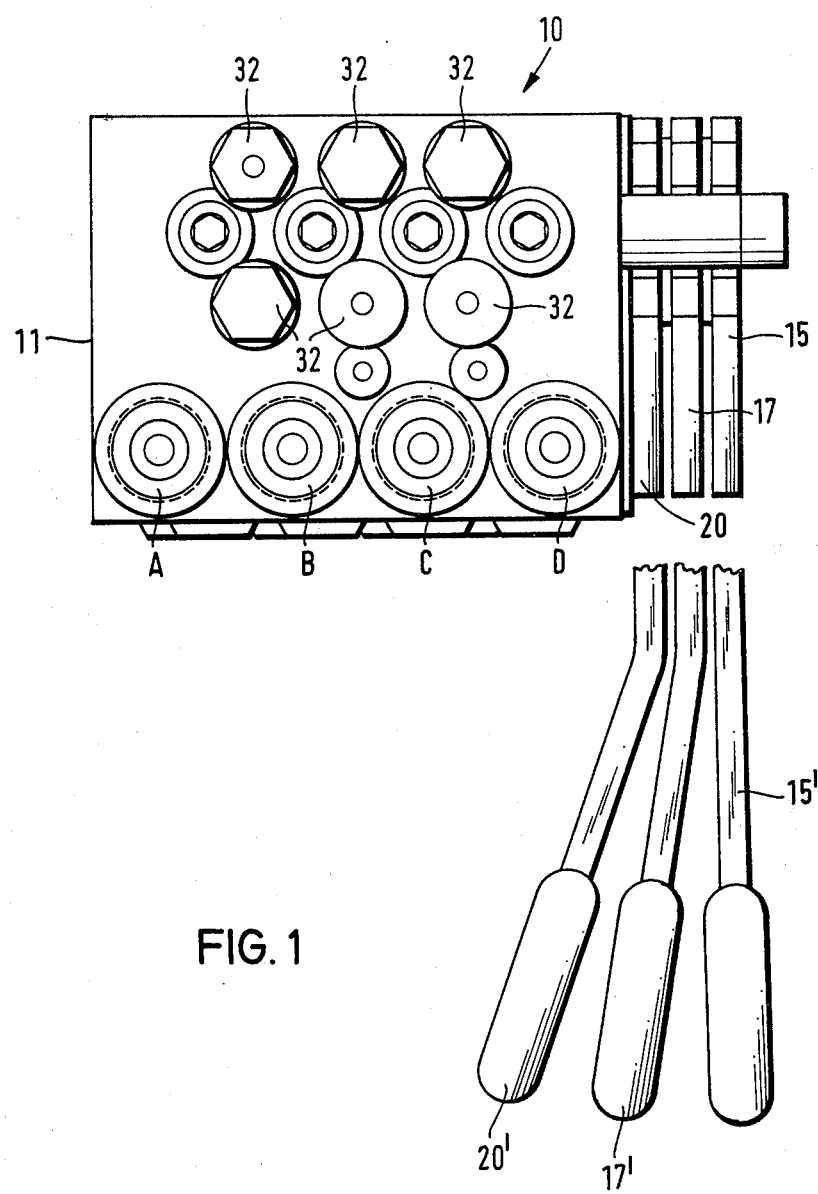
FIG. 1 is a diagrammatic side elevation of a hydraulic control device made in accordance with the invention.
Figure 2:
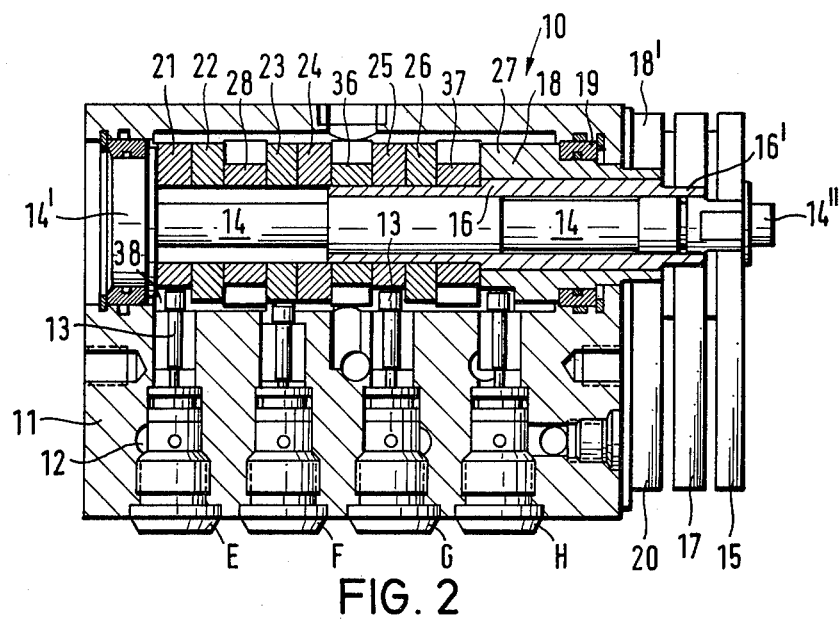
FIG. 2 is a sectional side view of the device shown in FIG. 1.

The hydraulic control device shown in the drawings and generally designated 10, is intended for use with mining apparatus, especially with one or more appliances, such as movable roof-supports. The device 10 has a main block or housing 11 in which are disposed a plurality of individual control valves. In the illustrated embodiment, some eight valves designated A to H are provided. The four valves A to D are aligned side-by-side in one common plane (FIG. 1), while the four valves E to H (FIG. 2) are aligned side-by-side in another common plane offset by 90° in relation to the plane of the valves A to D. All the valves A to H are of identical construction and are constructed as cartridges located in bores 12 in the housing 11 as easily interchangeable and replaceable units. The valves A to H have valve elements, such as balls, which are raised off seatings by means of tappets 13 which are in turn actuated by means of a multi-part cam shaft means rotatably mounted in the block 11. The cam shaft means has a central spindle 14 surrounded by a sleeve 16. The spindle 14 has one end portion 14' rotatably mounted in a bearing in the block 11 and another end portion 14" which projects outwardly from the block 11. A hand lever 15 is fitted to the end portion 14" of the spindle 14. The sleeve 16 is itself rotatable in relation to the spindle 14 and has an end portion 16' which also projects from the block 11. A hand lever 17 is fitted to the end portion 16' of the sleeve 16. A bearing bush 18 surrounds the sleeve 16 adjacent the end portion 16′ and is rotatably mounted in a bearing 19 in the block 11. The bush 18 also has an end portion 18′ projecting outwardly from the block 11. A hand lever 20 is fitted to the end portion 18′ of the bush 18. As shown in FIGS. 1 and 2, the levers 15,17,20 are located close together and have projections 15′,17′,20′ so they can be moved individually or collectively, as desired, to partly rotate their associated parts 14,16 and 18 about their common axis. Four cams 21 to 24 are mounted on the spindle 14 for rotation therewith. The cams 21 to 24 are arranged in pairs with the cams 21,22 forming one pair and the cams 23,24 forming another pair. The cams 21 to 24 have cam surfaces engaging with respective tappets 13 of the valves A, B, E, F. By partly rotating the spindle 14 in one direction or the other with the lever 15, the valves A, B, E, F can be opened and closed in sequence to effect some control function, e.g., to operate a double-acting shifting ram of a roof support.

Two cams 25,26 are mounted side-by-side on the sleeve 16 to rotate therewith. These cams 25,26 have cam surfaces engaging with the tappets 13 of the valves C and G. By partly rotating the sleeve 16 in one direction or the other with the lever 17, the valves C and G can be opened and closed in sequence to effect another control function, e.g., to relieve or set a row of props of the roof support.

The bush 18 is itself externally shaped to provide integral cams 27 with surfaces engageable with the tappets 13 of the valves H and D. By partly rotating the bush 18 in one direction or the other with the lever 20, the valves H and D can be opened and closed in sequence to effect a further control function, e.g., to relieve or set a second row of props of the roof support.

The construction is such that each operating element 14,16,18 of the cam shaft means need only be pivoted through an angle of not greater than 45° to operate the associated valves A–H.

Figure 3:
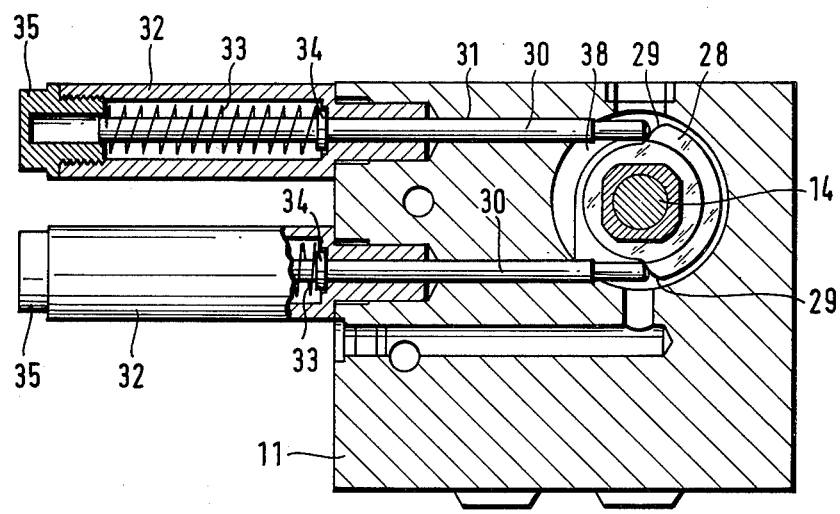
FIG. 3 is a sectional end view of the device shown in FIG. 1.

Each operating element 14,16,18 of the multi-part cam shaft means has its own "dead man's" handle biasing or restoring system. FIG. 3 shows the system pertaining to the spindle 14. The system employs a further cam 28 mounted on the spindle 14 between the cams 21,22 and 23,24. The cam 28 axially spaces the pair of cams 21,22 from the pair of cams 23,24 and is also rotatably fixed to the spindle 14. The cam 28 has cam surfaces 29 in diametrically opposite positions relative to the spindle 14. These cam surfaces 29 engage with plungers 30 guided in borings 31 in the block 11. Casings 32 are mounted to the block 11 conveniently by screw-threaded engagement. The plungers 30 extend through the casings 32 and are additionally guided by inner regions of the casings 32 and by screw-threaded plugs 35 located at the ends of the casings 32. Compression springs 33 surround the plungers 30 within the casings 32 and engage on collars 34 of the plungers 30 and on the plugs 35. The springs 33 urge the collars 34 against the inner end walls of the casings 32. FIG. 3 depicts the system with the spindle 14 and its handle 15 in a neutral or zero position. If the spindle 14 is partly rotated by means of the handle 15, in say the clockwise direction to operate selected valves in the group A, B, E, F, the plunger 30 at the lower part of FIG. 3 will be urged by the associated cam surface 29 of the cam 28 into the associated casing 32, thereby compressing its spring 33. At the same time, the spring 33 associated with the uppermost plunger 30 maintains the collar 34 of this plunger 30 in abutment with the end wall of the associated casing 32. If the lever 15 is released, the lower plunger 30 will be urged by its spring 33 to its former position and the cam 28 will be forced by the extending plunger 30 to rotate the spindle 14 back to its neutral position. If the spindle 14 is moved in the anti-clockwise direction, then the restoration will be accomplished by the uppermost plunger 30.

Systems similar to that described in connection with FIG. 3 for the spindle 14 are also provided for the sleeve 16 and the bush 18 and the additional casings 32 containing the springs 33 and plungers 30 of these systems can be seen in FIG. 1.

The plungers 30 of the system pertaining to the sleeve 16 engage on a cam 36 (shown in FIG. 2) fixed to the sleeve 16, while the plungers 30 of the system pertaining to the bush 18 engage on a cam 37 fixed to the bush 18. The cams 36,37 additionally act as spacers for axially spacing the cams 23,24 and 25,26. These systems act as described to also restore the bush 18 and the sleeve 16 to their neutral position upon release of the handles 17,20.

As shown in FIG. 3, a cavity or chamber 38 surrounds the cam shaft 14,16,18 and this cavity 38 is connected to a common hydraulic return line (not shown) and is normally filled with hydraulic pressure fluid. The necessary connections between the valves A–H, the hydraulic pressure feed and return lines and the various hydraulic working chambers of the appliance or appliances controlled by the device 10 are also not shown in the drawings.

One significant advantage of the device as depicted and described is that the levers 15,17,20 can be moved individually or collectively in a single operation through a small angle, thereby enabling a support to be relieved and shifted up while safety is preserved at all times by the systems which restore all the handles 15,17,20 to their neutral position automatically.

I claim:

1. In a hydraulic control device comprising a housing block containing a plurality of individual control valves operated by tappets and a rotatable cam shaft assembly actuated by hand lever means for displacing the tappets to operate the valves; the improvement comprising the cam shaft assembly is composed of a plurality of relatively rotatable cam shaft parts, each cam shaft part being partly rotatable by its own hand lever means is either rotational direction having cams mounted thereon which are arranged to actuate some of the valves each rotatable cam shaft part being further provided with at least one additional cam mounted thereon which is subjected to the action of a pair of spring loaded plungers which automatically restores the associated cam shaft part back to a pre-determined neutral position when its hand lever means is released.

2. A device according to claim 1, wherein the rotatable cam shaft parts at least include a central spindle surrounded by a hollow sleeve.

3. A device according to claim 1, wherein the valves are arranged in groups offset from one another and the operation of the valves is accomplished by part rotation of one or more of the rotatable cam shaft parts through an angle less than 90°.

4. Hydraulic control device comprising a housing, a plurality of individual pressure-fluid control valves provided in the housing, cam shaft means provided in the housing, the cam shaft means being composed of a plurality of relatively rotatable coaxial parts, hand levers for effecting part rotation of the respective parts of the cam shaft means, each part having a set of cams for operating some of the valves when said part is partly rotated in either direction by means of its associated hand lever, further cams provided on the coaxial parts of the cam shaft means and spring-loaded plungers acting on the further cams to bias each of said parts to a pre-determined neutral rotational position automatically when the associated hand lever is released.

5. A device according to claim 4, wherein the plungers engage on diametrically-opposed cam surfaces of the further cams.

6. A device according to claim 4, wherein each set of cams serves to displace tappets to actuate the valves when the associated hand lever is operated to partly rotate the associated part in either direction.

7. A device according to claim 4, wherein the further cams serve as axial spacers for the sets of cams.

8. A device according to claim 4, wherein each coaxial part is moved through a rotational angle less than 90° in either direction by means of its hand lever in order to operate associated valves.

9. A device according to claim 4, wherein the spring-loaded plungers are located and guided in casings attached to the housing.

10. A device according to claim 4, wherein the valves are arranged in side-by-side relationship in groups offset by 90° in relation to one another.

11. A device according to claim 4, wherein the rotatable parts comprise a central spindle surrounded by one or more hollow members.

12. A device according to claim 4, wherein the hand levers of the rotatable parts are disposed close together for manual actuation collectively or individually.

13. A device according to claim 4 wherein the valves are connected to a pressure fluid source and to apparatus controlled by the device and the cam shaft means is surrounded by a cavity in the housing which is connected to the valves to act as part of a pressure fluid return path.

* * * * *